Oct. 18, 1960
G. L. BENJAMIN, JR., ET AL
2,956,823
EXPANSION JOINT FOR PIPING
Filed July 17, 1958
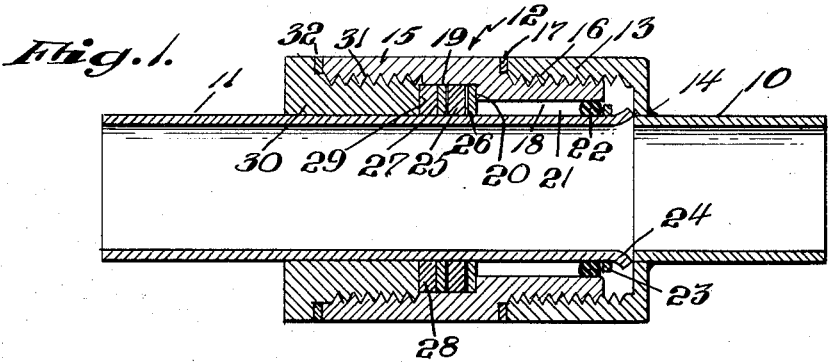
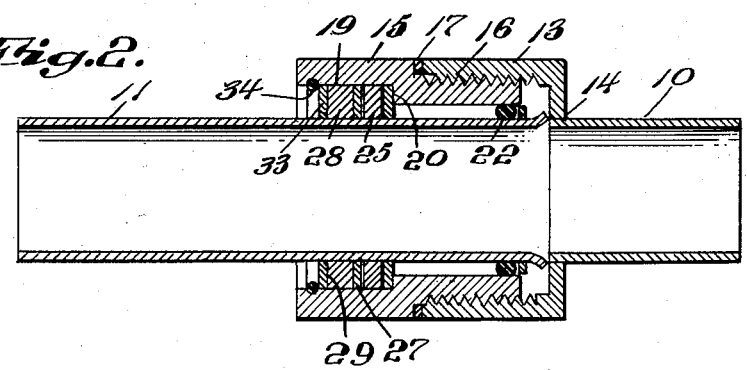
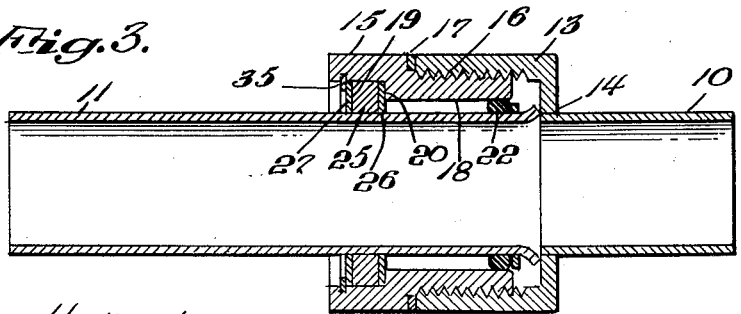
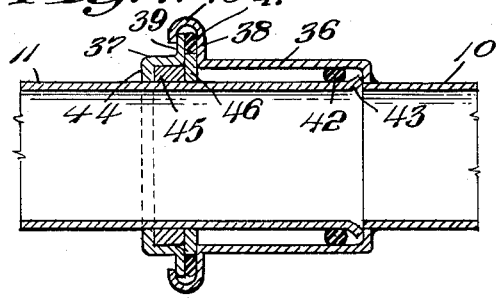
INVENTORS.
Gordon L. Benjamin, Jr.
Donald E. Hare
BY
Barlow & Barlow
ATTORNEYS.

10 Claims. (Cl. 285—298)

United States Patent Office

2,956,823
Patented Oct. 18, 1960

2,956,823

EXPANSION JOINT FOR PIPING

Gordon L. Benjamin, Jr., Barrington, and Donald E. Hare, East Greenwich, R.I., assignors to General Fittings Company, a corporation of Rhode Island Filed July 17, 1958, Ser. No. 749,198

10 Claims. (Cl. 285—298)

This invention relates to piping of the type used in buildings for conveying heating fluid. It is found in piping systems where there is a considerable change in temperature that some provision must be made for expansion and contraction of the linear length of the pipe and a so-called expansion joint has been provided for such piping which will permit a certain axial movement lengthwise of the pipe for accommodating varying lengths due to temperature change.

Occasionally expansion joints which have heretofore been marketed will leak due to one cause or another which is exceedingly annoying or destructive of surroundings in the installations in which they are used.

One of the objects of this invention is to provide an expansion joint which in addition to a primary sealing means will be provided with an auxiliary or secondary sealing means which will come into operation upon failing of the primary means.

Another object of the invention is to provide a construction in which both primary and secondary sealing means are accessible to be replaced in a much easier manner than constructions which have heretofore existed.

Another object of the invention is to provide a secondary sealing means which will be simple in construction and inexpensive to incorporate in the expansion joint.

Another object of the invention is to provide a construction which will eliminate the use of bellows or such expensive equipment in the seal.

Another object of the specialized form of the invention is to provide a packing which will be actuated by a hygroscopic material as distinct from the hygroscopic material providing a seal or an auxiliary seal which is utilized.

With these and other objects in view, the invention consists of certain novel features of construction as will be more fully described and particularly pointed out in the appended claims.

In the accompanying drawings:

Figure 1 is a sectional view of the expansion joint showing one form of joint of this invention;

Figure 2 is a similar view of a slight modification;

Figure 3 is a sectional view of a still different modification; and

Figure 4 is a sectional view of a still different modified form of the invention.

In proceeding with this invention, we have provided a pair of pipe sections with a two-part casing embracing the end portions of the pipe sections. The two parts of the casing are secured together usually in a detachable manner and one part of the casing is fixedly secured to one pipe section in a sealed relation therewith. The other pipe section is slidably related in the casing and is sealed by primary sealing means such as an O-ring between the casing and the outer surface of the pipe section and then in addition to this arrangement we have provided a secondary sealing means which involves a confining of a hygroscopic material between radial surfaces which form abutments within the casing so that should the O-ring leak and moisture or liquid contact the hygroscopic material it will swell and either itself provide an additional seal or in certain forms of the invention will actuate a secondary packing which provides the secondary seal. This hygroscopic material and packing in most instances of the invention will be readily accessible and may be easily withdrawn and replaced should the occasion require. By having the two parts of the casing detachably engage such as by threading, the primary seal or O-ring may also be readily replaced thus providing a very advantageous form of expansion joint and one which may be repaired on the job with a minimum amount of detachment of the piping system.

With reference to the drawings the two pipe sections are designated 10 and 11 which may be tubing or other suitable form of conduit. The casing designated generally 12 comprises a part 13 which is secured to the section 10 such as by welding at 14 in a sealed fixed relation with this section of piping. Another part 15 of the casing has threaded engagement as at 16 with the casing part 13 while a sealing soft packing 17 may be located between these two parts to be squeezed upon tightening of the threaded engagement so as to provide an effective seal between them.

The part 15 of the casing is provided with a bore 18 and a larger bore 19, thus providing a shoulder 20 between these two bores. The piping section 11 is axially slidable within the bore 18 and is spaced therefrom as at 21 in which space there is located an O-ring 22 which is of a size in diameter to be held under compression in the space 21 between the inner surface of the wall of bore 18 and the outer surface of the section of pipe 11. In order that this O-ring will not slide off of the end of the pipe section, the pipe section is provided with an abutment such as a ring 23 which engages the flared end as at 24, thus insuring that the O-ring will not pass beyond the end of the part 15 of the casing.

In the larger bore 19 of the casing we have provided hygroscopic material 25 which substantially fills the space between the outer surface of the pipe section 11 and the surface of the bore 19. Also, of substantially the same radial dimensions as the hygroscopic material there is provided a metal washer 26 between the hygroscopic material and the shoulder 20 and a washer 27 engaging the hygroscopic material on the side thereof which is distant from the shoulder 20. These washers serve as abutment surfaces and to confine the hygroscopic material. It is well known that when this hygroscopic material becomes wet, it will expand in volume both radially and axially.

In Figures 1 and 2 a packing material 28 is located in contact with the washer 27 while an abutment surface 29 engages this packing material on its other side or the side distant from the hygroscopic material. This abutment surface 29 in Figure 1 is provided by a gland nut 30 threaded into the part 15 of the casing as at 31 and sealed therewith by a soft packing 32, whereas the abutment surface 29 in Figure 2 is provided by a washer 33 which is held in position by a spring ring 34. In the arrangement shown in Figures 1 and 2 when the hygroscopic material 25 expands it will be limited radially by the bore 19. The shoulder 20 will prevent the hygroscopic material from movement axially to the right, but as the washer 27 is not so limited this washer will move axially to the left and compress the packing material 28 which will press against the abutment 29 but as this is fixed, then further movement of the packing material will expand the packing material radially and form a seal between the bore 19 and the outer surface of the pipe section 11, these being concentric circles will provide a tight joint along their concentric surfaces.

In Figure 3 the washer 27 is held against axial movement, which movement may occur of the washer 27 in Figures 1 and 2 by a spring ring 35 seated in a recess in the part 15 of the casing. Thus as the hygroscopic material 25 expands in Figure 3, it, not being permitted to expand axially by sliding the washer 27, will expand radially and itself provide a seal along the bore or surface of the bore 19 and along the outer surface of the pipe section 11.

Figures 1, 2 and 3 are so closely related from a structure standpoint that they have been described in conjunction with one another. In Figure 4, however, although the same principles are employed, the structure is a little different and instead of holding the two parts 36 and 37 of a casing together by threading, these parts are both flanged as at 38 and 39 and one part 38 is rolled over the other part as at 40 so as to secure them together. A soft packing 41 is located between the flanges in order that a tight joint may be provided. Here as before the inner surface of the casing is spaced from the outer surface of the pipe section 11 and an O-ring 42 is positioned in this space. The pipe section is flared as at 43 to provide a means to prevent the O-ring from passing beyond the end of the section 11 when it is slid along the casing axially thereof and away from the section 10. In this showing the part 37 of the casing is provided with a flange 44 extending inwardly into close proximity with the outer surface of the section 11 which is filled with hygroscopic material 45 which engages the inner surface of the flange 44 providing an abutment therefor and engages the radial surface of the washer 46 which is confined between the flanges 38 and 39 of the casing so that should liquid get past the O-ring 42 and engage or wet this hygroscopic material 45, it would expand and being confined against any movement axially would expand radially so as to provide a seal along the inner surface of the casing at the portion 37 and the outer surface of the pipe section 11 and thus seal against escape of the liquid which was being conducted through the pipe sections 10 and 11. It will be seen that the showing in Figure 4 is more along the lines of the showing of Figure 3 in that it utilizes radial expansion of the hygroscopic material to provide a seal itself rather than utilizing axial expansion of the hygroscopic material to press against additional packing which provides a seal between the parts.

We claim:

1. An expansion joint for piping comprising a pair of pipe sections, a casing to embrace the end portions of the pipe sections comprising two parts secured together in sealed relation, one part being fixed in sealed relation to one section and the other part being slidably related to said casing, said casing having the inner surface of its wall in spaced relation to the outer surface of the other slidable section and primary sealing means comprising an O-ring of resilient material held under compression between said surfaces and secondary means to effect a seal between said surfaces including a hygroscopic material between said surfaces which becomes actuated by liquid contacting the same upon failure of the primary sealing means to provide a seal between said casing and other section.

2. An expansion joint as in claim 1 wherein said secondary sealing means comprises a pair of radially extending abutment surfaces between which said hygroscopic material is located.

3. An expansion joint as in claim 2 wherein at least one of said radial surfaces is a washer engaging said hygroscopic material.

4. An expansion joint as in claim 1 wherein said casing has two different size bores providing a shoulder between them with said O-ring in the smaller bore and said hygroscopic material in the larger bore with a washer engaging said shoulder on one side and said hygroscopic material on the other side.

5. An expansion joint as in claim 4 wherein a radial abutment is provided on the other side of said hygroscopic material distant from said shoulder to removably secure the last said radial abutment to said casing.

6. An expansion joint as in claim 1 wherein the parts of said casing are detachably secured together.

7. An expansion joint as in claim 1 wherein the parts of said casing are detachably secured together by interengaging threads.

8. An expansion joint as in claim 1 wherein said secondary sealing means comprises a sealing packing for radial expansion upon axial pressure, a radial abutment surface engaging the same on the side distant from the O-ring, and means comprising said hygroscopic material for directing an axial urge on said packing located between the packing and said O-ring.

9. An expansion joint as in claim 8 wherein the last said means comprises an abutment held against axial movement relative to said casing on the side of the material nearest the O-ring and an axially movable washer on the side of the hygroscopic material distant from the O-ring.

10. An expansion joint as in claim 9 wherein said packing washer and hygroscopic material are in sandwiched engagement.

References Cited in the file of this patent

UNITED STATES PATENTS

| 1,204,728 | Arena | Nov. 14, 1916 |
| 2,323,179 | Hall | June 29, 1943 |
| 2,420,721 | Pennella | May 20, 1947 |
| 2,467,911 | Reilly | Apr. 19, 1949 |
| 2,481,258 | Swartley | Sept. 6, 1949 |